(12) United States Patent
Miller et al.

(10) Patent No.: US 8,942,670 B1
(45) Date of Patent: *Jan. 27, 2015

(54) CARRIER NETWORK DETERMINATION FOR PROVIDING REAL-TIME CUSTOMER FEEDBACK OF CALL INFORMATION

(71) Applicant: Cox Communications, Inc., Atlanta, GA (US)

(72) Inventors: Deborah Miller, Metairie, LA (US); Douglas David Gravino, Roswell, GA (US); Radhakrishnan Gopinath, Alpharetta, GA (US)

(73) Assignee: Cox Communications, Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/176,925

(22) Filed: Feb. 10, 2014

Related U.S. Application Data

(63) Continuation of application No. 13/249,758, filed on Sep. 30, 2011, now Pat. No. 8,649,762.

(51) Int. Cl.
*H04M 11/00* (2006.01)
*H04M 15/00* (2006.01)
*H04W 4/24* (2009.01)

(52) U.S. Cl.
CPC .......... *H04M 15/8353* (2013.01); *H04W 4/24* (2013.01)

USPC .......... 455/407; 455/405; 455/406; 455/408; 379/114.01; 379/114.03; 379/114.06

(58) Field of Classification Search
USPC .......................... 455/406, 407, 408
See application file for complete search history.

(56) References Cited

U.S. PATENT DOCUMENTS

| | | | |
|---|---|---|---|
| 6,195,543 B1 | 2/2001 | Granberg | |
| 6,408,174 B1 | 6/2002 | Steijer | |
| 6,434,537 B1 | 8/2002 | Grimes | |
| 6,654,599 B1 | 11/2003 | Lundström et al. | |
| 7,391,854 B2 | 6/2008 | Salonen et al. | |
| 8,649,762 B1 | 2/2014 | Miller et al. | |
| 2002/0085694 A1 | 7/2002 | Ruckart | |
| 2004/0240649 A1 | 12/2004 | Goel | |
| 2006/0246876 A1 | 11/2006 | Awada et al. | |
| 2007/0053330 A1 | 3/2007 | Stafford et al. | |
| 2008/0182552 A1 | 7/2008 | Dinh et al. | |
| 2008/0188227 A1 | 8/2008 | Guedalia et al. | |
| 2008/0274715 A1 | 11/2008 | Heit et al. | |
| 2010/0261460 A1 | 10/2010 | Gosselin et al. | |

*Primary Examiner* — Mazda Sabouri
(74) *Attorney, Agent, or Firm* — Merchant & Gould

(57) ABSTRACT

Real-time customer feedback of call information is determined by a carrier network. Databases are used to map individual phone numbers to the carrier currently servicing that number and to lookup the carrier information for the other party during each call. This information may be displayed on the customer's handset device. Furthermore, this called party network carrier information could be used in conjunction with information about the calling party's rate plan to display the actual cost status of the call on the customer's handset.

20 Claims, 10 Drawing Sheets

CARRIER NETWORK DETERMINATION FOR PROVIDING REAL-TIME CUSTOMER FEEDBACK OF CALL INFORMATION

CROSS REFERENCE TO RELATED APPLICATIONS

The present application is a continuation of U.S. application Ser. No. 13/249,758 filed Sep. 30, 2011 entitled "Carrier Network Determination for Providing Real-Time Customer Feedback of Call Information," now U.S. Pat. No. 8,649,762 of which is hereby incorporated by reference.

FIELD OF THE INVENTION

This disclosure relates in general to telephony services, and more particularly to providing carrier network determination to deliver real-time customer feedback of call information.

BACKGROUND

A phone can make and receive telephone calls to and from the public telephone network. It does this by connecting to a network provided by a network operator. The public switched telephone network (PSTN) is the network of the world's public circuit-switched telephone networks. The PSTN includes telephone lines, fiber optic cables, microwave transmission links, cellular networks, communications satellites, and undersea telephone cables, all inter-connected by switching centers, thus allowing any telephone in the world to communicate with any other. Originally the PSTN was implemented as a network of fixed-line analog telephone systems. However, the PSTN is now almost entirely digital in its core and includes mobile as well as fixed telephones.

In addition to telephony, modern mobile phones also support a wide variety of other services such as text messaging, MMS, email, Internet access, short-range wireless communications (infrared, Bluetooth), business applications, gaming and photography. Mobile phones that offer these more general computing capabilities are referred to as smartphones.

Some types of calls are not charged, such as local calls (and Internal calls) dialed directly by a telephone subscriber. In other areas, all telephone calls are charged a fee for the connection. Fees depend on the provider of the service, the type of service being used, i.e., the subscriber's service plan, and the distance between the calling and the called parties. In some circumstances, the caller pays a flat rate charge for the telephone connection and does not pay any additional charge for all calls made.

Many popular mobile telephone plans allow free in-network calling, free mobile-to-mobile calling, free mobile-to-mobile texting, or other discounts based on whether or not the other party one is communicating with is using a mobile phone or whether the other party is using a specific carrier. Discounts may apply to inbound communication, outbound communication, or other criteria.

Currently, the only way to take full advantage of carrier-based discounts such as free mobile-to-mobile, etc. is to either specifically ask all the people one converses with for their phone carrier information or to carefully comb through one's monthly bill to see which numbers qualified under the calling program and remember those for the future. Unfortunately, there is no straightforward method a customer can use to determine whether the person they are communicating with is on a mobile phone or what carrier it is on, hence it is difficult to take full advantage of some calling discounts.

SUMMARY OF THE INVENTION

To overcome the limitations described above, and to overcome other limitations that will become apparent upon reading and understanding the present specification, embodiments for providing carrier network determination to deliver real-time customer feedback of call information are disclosed.

The above-described problems are solved by utilizing well-known databases that map individual phone numbers to the carrier currently servicing that number and lookup the carrier information for the other party during each call. This information may be displayed on the customer's handset device. Furthermore, this called party network carrier information could be used in conjunction with information about the calling party's rate plan to display the actual cost status of the call on the customer's handset.

An embodiment includes a method for providing real-time feedback of call information. The method includes receiving an indication of initiation of a call at a first communication device, routing information associated with the initiated call to a look-up rating system having access to databases for obtaining look-up rating information, determining a cost of the initiated call based on the obtained look-up rating information and passing the determined cost and associated call information to the first communication device for presenting the determined cost and associated call information at the first communication device.

In another embodiment, a look-up rating system for providing real-time feedback of call information is disclosed. The look-up rating system includes at least one database for storing information associated with carriers involved with an initiated call, information associated with a service plan associated with devices involved with the initiated call, and parameters associated with the service plan associated with devices involved with the initiated call, a mobile switch for receiving an indication of initiation of a call at a first communication device, the mobile switch further configured for performing call routing for supporting call connections, and a look-up rating system, coupled to the at least one database and the mobile switch, the look-up rating system receiving routing information associated with the initiated call, obtaining from the at least one database look-up rating information associated with the initiated call and determining a cost of the initiated call based on the obtained look-up rating information, wherein the look-up rating system provides the determined cost and associated call information to the mobile switch for routing to the first communication device for presentation of the determined cost and associated call information at the first communication device.

In another embodiment, a communication device configured for receiving real-time feedback of call information is disclosed. The communication device includes memory for storing data, a processor, coupled to the memory, for providing communication operation functions, and a display, operative coupled to the processor, the display provided for presenting information to a user for enabling execution of communication operation functions, wherein the processor provides an indication of initiation of a call and receives cost and associated call information, the processor presenting the received determined cost and associated call information on the display, the cost and associated call information being based on information associated with carriers involved with the initiated call, information associated with a service plan associated with the communication device and parameters associated with the service plan subscribed to by the communication device.

In another embodiment, a computer readable medium including executable instructions which, when executed by a processor, provides real-time feedback of call information is disclosed. The executable instructions provide real-time feedback of call information by receiving an indication of initiation of a call at a first communication device, routing information associated with the initiated call to a look-up rating system having access to databases for obtaining look-up rating information, determining a cost of the initiated call based on the obtained look-up rating information and passing the determined cost and associated call information to the first communication device for presenting the determined cost and associated call information at the first communication device.

These and various other advantages and features of novelty are pointed out with particularity in the claims annexed hereto and form a part hereof. However, for a better understanding of the disclosed embodiments, the advantages, and the objects obtained, reference should be made to the drawings which form a further part hereof, and to accompanying descriptive matter, in which there are illustrated and described specific examples of the disclosed embodiments.

BRIEF DESCRIPTION OF THE DRAWINGS

Referring now to the drawings in which like reference numbers represent corresponding parts throughout.

DETAILED DESCRIPTION

Embodiments of the present invention are directed to providing carrier network determination to deliver real-time customer feedback of call information. Databases are used to map individual phone numbers to the carrier currently servicing that number and to lookup the carrier information for the other party during each call. This information may be displayed on the customer's handset device. Furthermore, this called party network carrier information could be used in conjunction with information about the calling party's rate plan to display the actual cost status of the call on the customer's handset.

Figure 1:
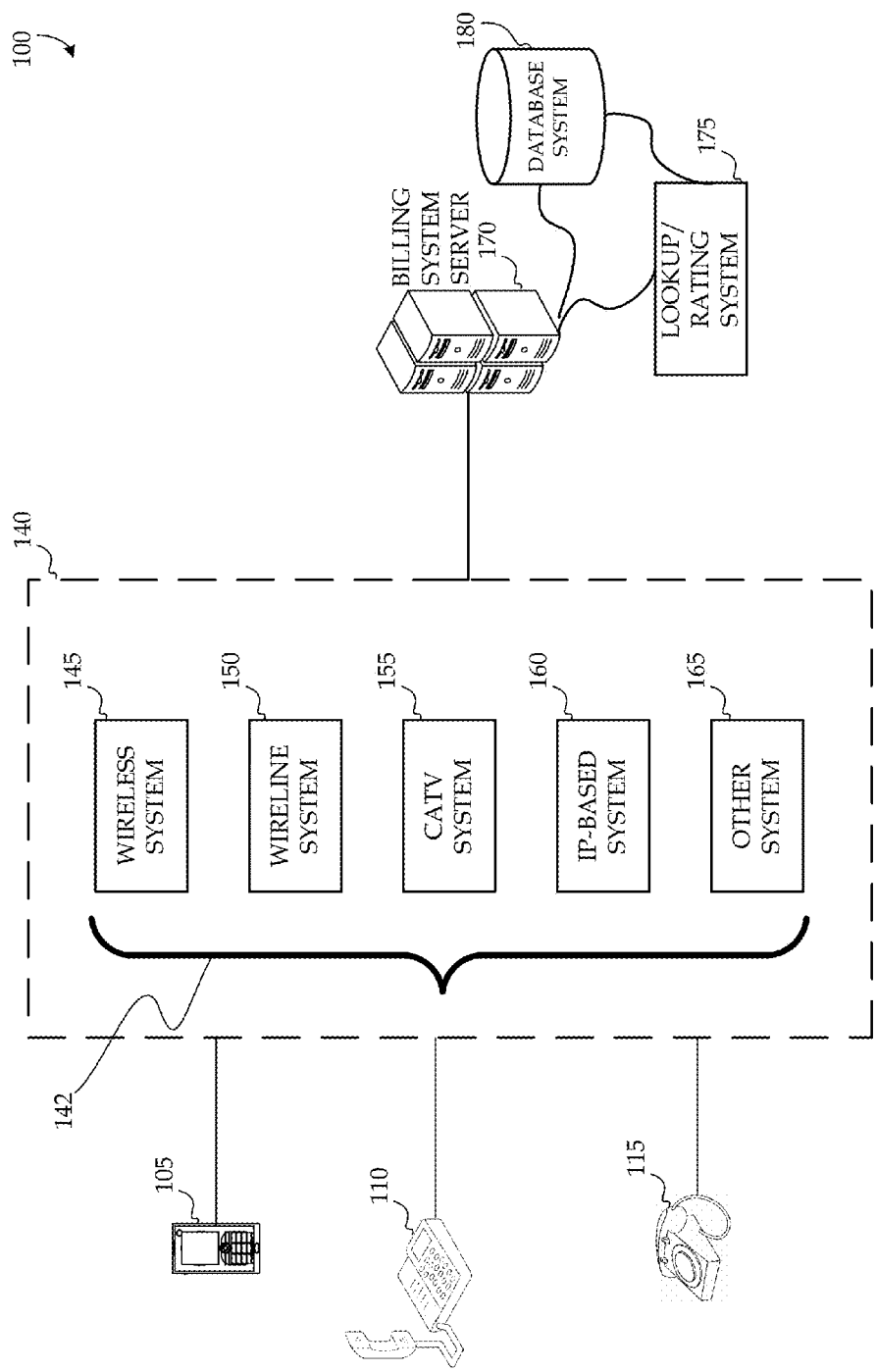
FIG. 1 illustrates a block diagram of a system for providing carrier network determination to deliver real-time customer feedback of call information according to an embodiment.

FIG. 1 illustrates a block diagram of a system for providing carrier network determination to deliver real-time customer feedback of call information 100 according to an embodiment. In FIG. 1, a mobile phone 105 and two wired phones 110, 115 are coupled to a communication network 140. The communication network 140 may include one or more communication systems 142 including a wireless system 145 (e.g., cellular network), a wireline system 150 (e.g., public switched telephone network (PSTN)), a CATV system 155, an IP based system 160, and other systems 165. The communication network 140 is coupled to a billing system server 170. The billing system server 170 is coupled to a lookup rating system 175. The lookup rating system 175 may be coupled to one or more databases 180.

Whenever a carrier associated with one of the communication systems 140 attempts to route an outbound call or other communication, the communication systems 142 may access a variety of databases 180 to lookup which other of the communication systems 142 provides service to the called party. This process of performing a lookup using the databases 180, with some exceptions, tends to be performed for each call. Furthermore, each of the communication systems 142 has knowledge about the specific rate plan of each of its customers such that it can accurately generate bills.

Figure 2:
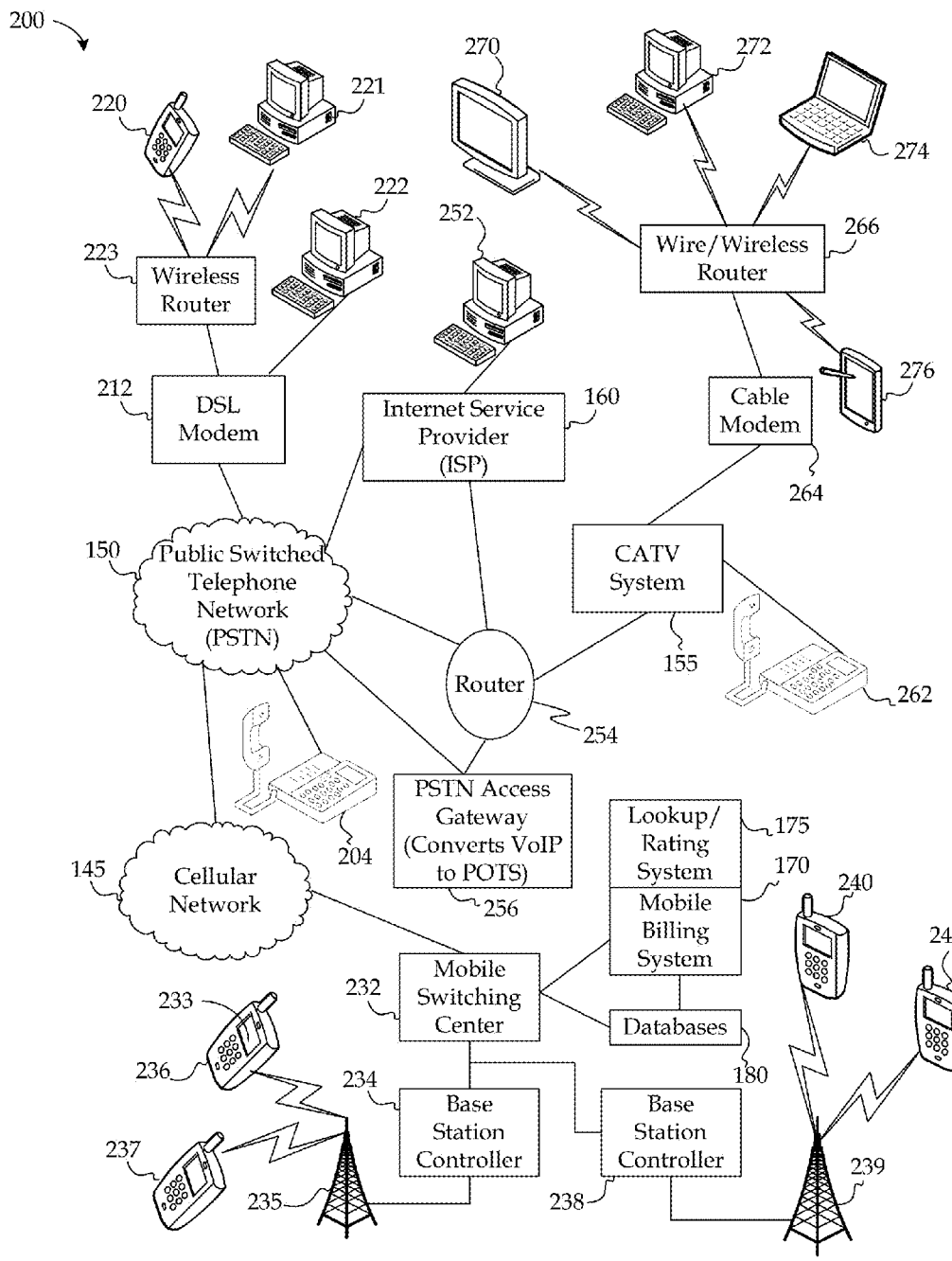
FIG. 2 is a detailed block diagram of a network for providing carrier network determination for delivering real-time customer feedback of call information according to an embodiment.

FIG. 2 is a detailed block diagram 200 of a network for providing carrier network determination for delivering real-time customer feedback of call information according to an embodiment. In FIG. 2, a telephone 204 is provided server via the wireline or public switched telephone network (PSTN) 150. The public switched telephone network (PSTN) 150 is also coupled to a DSL modem 212 to provide digital services to smart phone 220, desktop computers 221, 222. Smart phone 220 and desktop computer 221 are coupled to the DSL modem 212 via a wireless router 223. Public switched telephone network (PSTN) 150 is further coupled to a wireless or cellular network 145. Cellular network 145 is coupled to a mobile switching center 232, which switches digital voice data packets from one network path to another and provides the information that is needed to support mobile service subscribers, such as user registration and authentication information. A first 234 and second 238 base station controller are coupled to the mobile switching center 232. The base station controllers 234, 238 support multi-channel two-way communication by registering mobile phones in the cellular network, and by performing handoff, call setup and call termination. A cell tower 235 is used by base station controller 234 to communicate with mobile phones 236, 237. Cell tower 239 is used by the base station controller 238 to communicate with mobile phones 240, 241. The cellular network also has access to mobile billing system 170 and its associated databases 180 that are coupled to mobile switching center 232. A lookup/rating system 175 may also be provided to determine cost rates for calls.

An Internet Service Provider (ISP) or IP-based system 160 is coupled to the public switched telephone network (PSTN) 150. A desktop computer 252 is shown coupled to the ISP 160. The ISP 160 and the PSTN 150 are also each coupled to a router 254. Further, a PSTN Access Gateway 256 is coupled to the router 254 and the PSTN 150. The PSTN Access Gateway 256 converts VoIP (voice over IP) signals to POTS (plain old telephone signals). A CATV system 155 is coupled to the router 254. The CATV system 155 may provide telephone services to telephone 262. A cable modem 264 may also be coupled to the CATV system 155. The cable modem 264 may be coupled to a router 266, e.g., wire or wireless router. The router 266 supports communication between the CATV system 155 and a wireless television 270, a desktop computer 272, a laptop 274 and a smart phone 276.

While not shown in FIG. 2, those skilled in the art recognize that multiple cellular networks 145, CATV system 155, DSL providers, etc. may be coupled together according to the description provided herein. Furthermore, those skilled in the art recognize that the networks and associated components shown in FIG. 2 are not meant to limit any embodiments. Rather, the networks and associated components shown in FIG. 2 are merely shown to demonstrate the interconnectedness of the subscribers to such networks. Thus, subscribers on multiple networks using a variety of communications devices may communicate with one another by traversing the networks.

According to one embodiment, existing, available network data is used to tell customers in real-time whether the person they're talking to qualifies for their particular calling program to further keep monthly telephony costs under control and avoid "bill shock".

According to an embodiment, two separate pieces of information are brought together at the beginning of a communication session to provide the subscriber or customer with real-time feedback about the rate that will be applied to that particular communication. This concept can be applied to nearly any communications service in FIG. 2, dependent on phone numbers and for which a carrier might offer discounts, such as voice calling, SMS messaging, MMS messaging, video calling, international calling, etc.

As an incoming call is being received on mobile phone 236, the rate information is displayed on-screen (e.g., "You have 180 free daytime minutes remaining" or "Free Mobile-to-Mobile Call"). As a customer is placing an outbound call using mobile phone 236, the screen display 233 may present a specific symbol to show that the call is free (e.g. a green dollar sign with a red slash symbol across it) or a different symbol to show the call is being charged (e.g. a red dollar sign). Further, as a customer using mobile phone 236 is about to send an outbound SMS message to a friend at smart phone 220, who is using a different carrier to provide phone service, a warning about the cost of the text (e.g. "$0.10 for Out-of-Network") may be displayed along with presenting a message asking the user of mobile phone 236 to confirm the message by responding to the "do you want to continue?" message.

In addition, as a first customer of a first carrier is using mobile phone 236 is talking to a second customer that is using mobile phone 240 and who is a customer of a second carrier, the mobile phone 236 may display a marketing message saying that the first customer may receive a $20 credit on their next bill if the second customer switches to the first carrier. Still further, as a customer places and receives calls, the mobile phone 236 keep track of the carriers used by each of the people in the customer's address book and store that information in the address book. When the customer next browses the address book looking for a number of a contact, the customer sees the cost to talk to that contact before the customer even choose to place the call to the contact.

Embodiments herein are implemented using a lookup/rating system 175 that re-uses information gained during traditional routing database queries when possible, e.g., outgoing calls, etc. The lookup/rating system 175 may also be configured as part of a mobile switching center 232 or as an affiliated computer server, i.e., integrated with the mobile billing system 170. Alternatively, a fresh carrier lookup may be performed as necessary to obtain the opposite party's carrier information. The mobile billing system 170 may be queried to obtain the proper rate plan from databases 180. The lookup/rating system 175 may then determine the cost/rate for the call, text message, etc., and send the determined cost/rate information to the mobile phone 236. In addition, such information may be sent to a speech-to-text system or a caller-ID display unit. Communication between the lookup/rating system 175 and the display 233 may take a variety of forms, including normal IP data traffic, various protocols, or proprietary formats.

Figure 3:
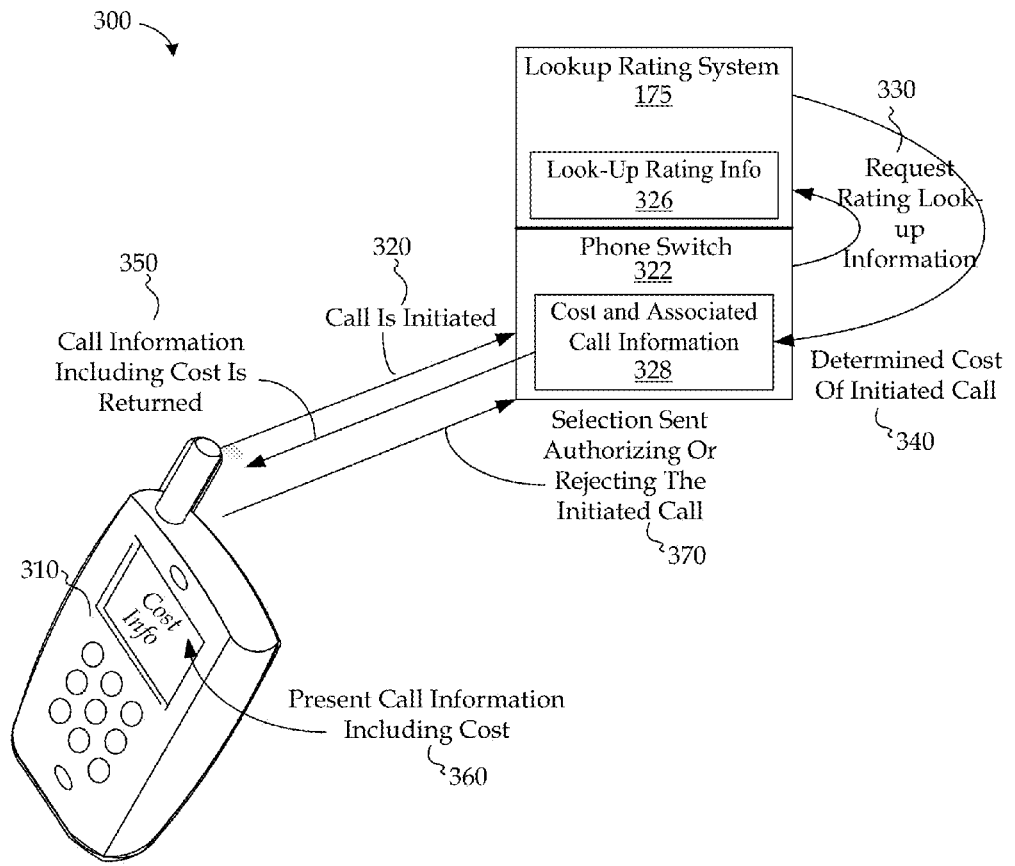
FIG. 3 illustrates a flow diagram for providing carrier network determination to deliver real-time customer feedback of call information according to an embodiment.

FIG. 3 illustrates a flow diagram 300 for providing carrier network determination to deliver real-time customer feedback of call information according to an embodiment. A call is initiated at a first communication device 310. Information associated with the initiated call 320 is routed to a phone switch 322 having a look-up rating system 175. The look-up rating system 175 may be integrated with the phone switch 322 or may be provided separately, either locally or remotely. The phone switch 322 sends a request 330 to the look-up rating system 175 to obtain look-up rating information 326. A cost of the initiated call is determined based on obtained look-up rating information 340, e.g., a type of network, an amount of minutes available for servicing the initiated call, the carriers involved with the initiated call and the service plan of the first communication device 310. Call information including the cost of the initiated call 328 is passed 350 from the phone switch 322 to the first communication device 310. The call information associated with the initiated call, including the determined cost of the initiated call, is presented 360 using the first communication device 310. The presentation of the call information and the determined cost may occur after a connection for the initiated call has been made, after a call number has been entered for the initiated call and before a connection for the initiated call has been made, before an incoming call to the first communication device is answered and after an incoming call to the first communication device is answered. Nevertheless, after the call information and the determined cost have been presented, a selection authorizing or rejecting the initiated call is forwarded 370 back to the phone switch 322.

Figure 4:
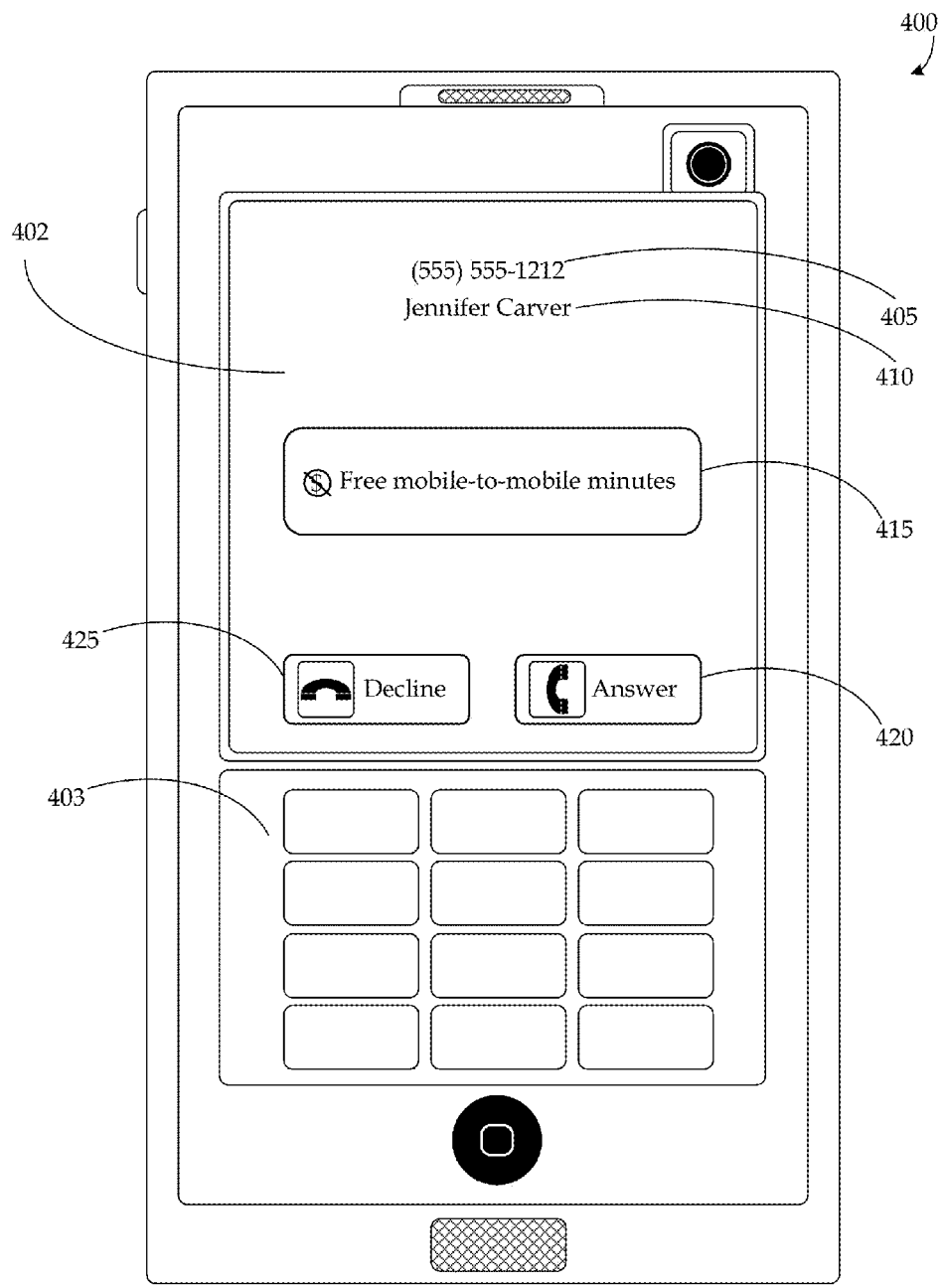
FIG. 4 is a view of call information displayed on a communication device according to an embodiment.

FIG. 4 is a view of call information 400 displayed on a communication device according to an embodiment. In FIG. 4, the communication device includes a display 402 and a keypad 403. On the display 402, call information is displayed, including a calling number 405, the name of the calling party 410, i.e. Jennifer Carver, cost information 415, and a call handling selector for authorizing the call 420 and for declining the call 425. The cost information 415 indicates that the incoming call is associated with free mobile-to-mobile minutes. The user may use selector 420 to answer the call without incurring charges.

Figure 5:
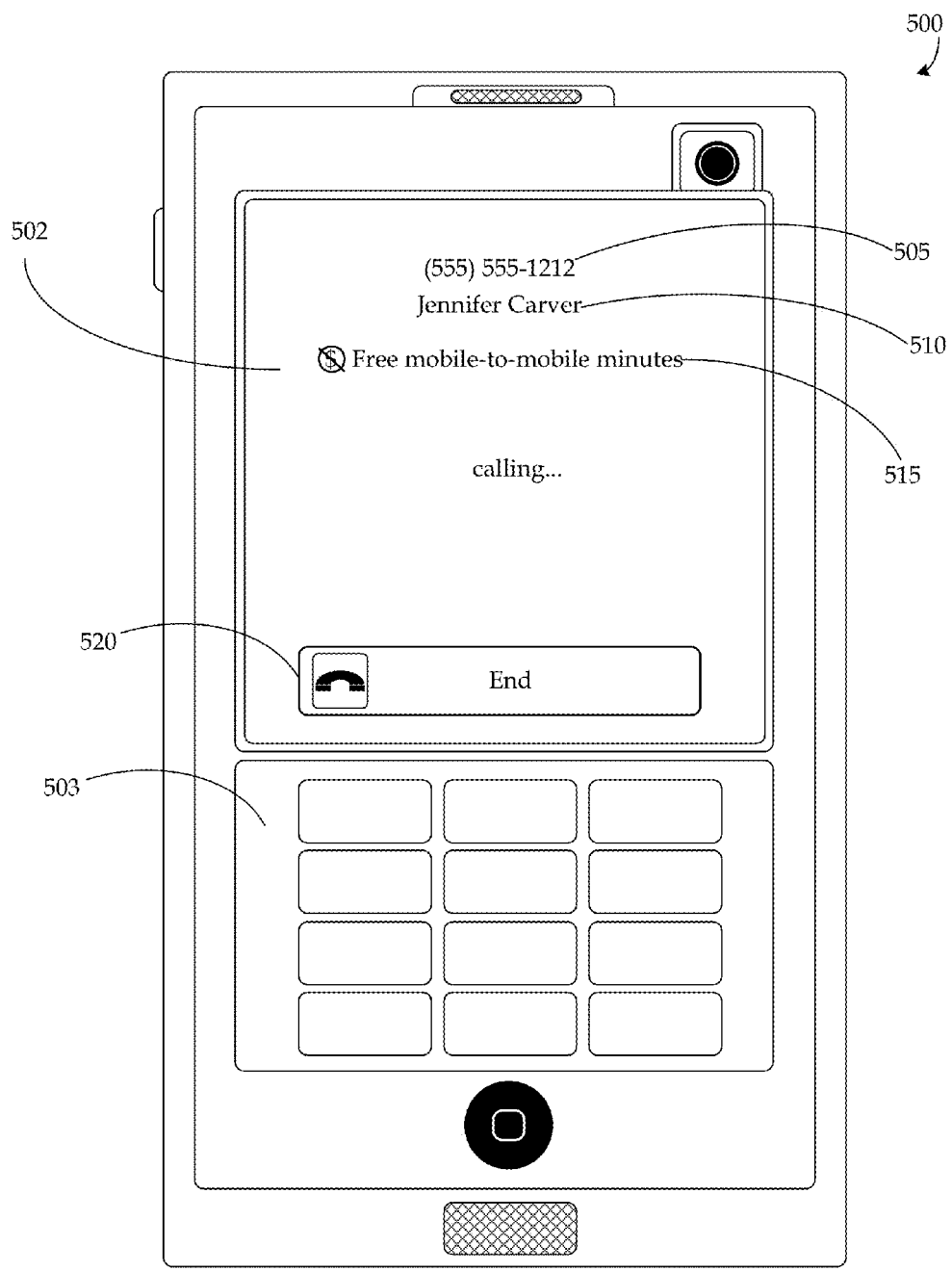
FIG. 5 is a view of call information displayed on a communication device according to an embodiment.

FIG. 5 is a view of call information 500 displayed on a communication device according to an embodiment. In FIG. 5, the communication device includes a display 502 and a keypad 503. On the display 502, call information is displayed, including a called number 505, the name of the called party 510, i.e. Jennifer Carver, cost information 515, and a selector for ending the call 520. The cost information 515 indicates that the call is associated with free mobile-to-mobile minutes. Thus, the user may continue the call without incurring charges.

Figure 6:
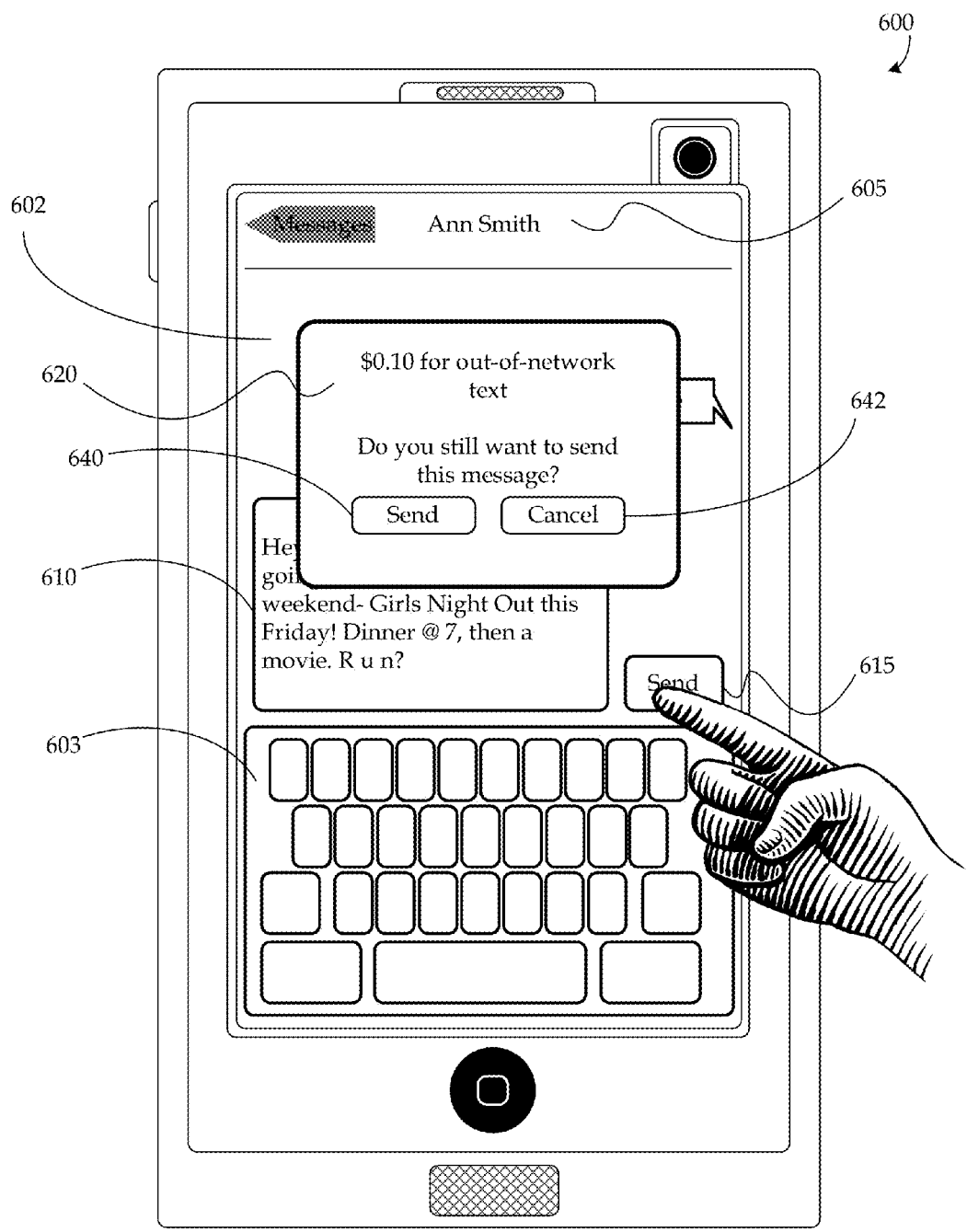
FIG. 6 is a view of call information displayed on a communication device according to an embodiment.

FIG. 6 is a view of call information 600 displayed on a communication device according to an embodiment. In FIG. 6, the communication device includes a display 602 and a keypad 603. On the display 602, a text 610 has been composed. The user has pushed the send selector 615 to send the text. However, in response to the send selector 615 being pushed, cost information 620 is displayed. In FIG. 6, the cost information 620 indicates that the text will cost $0.10 because the designated recipient is an out-of-network recipient. The cost information 620 also includes a selector for sending the text 640 and a selector for canceling the text 642. Thus, the user may send the text by using selector 640, but the user will be charged $0.10.

Figure 7:
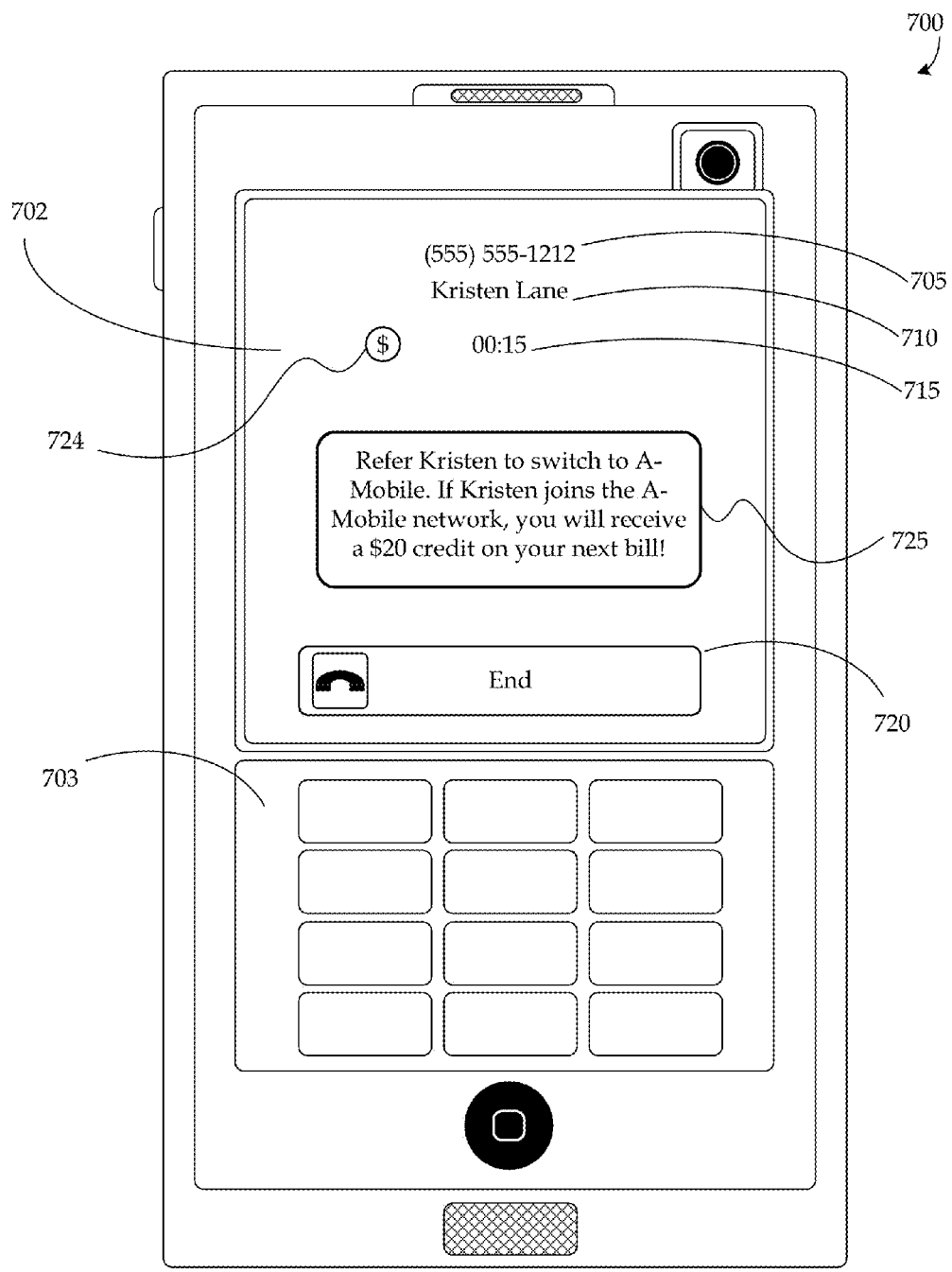
FIG. 7 is a view of call information displayed on a communication device according to an embodiment.

FIG. 7 is a view of call information 700 displayed on a communication device according to an embodiment. In FIG. 7, the communication device includes a display 702 and a keypad 703. On the display 702, a call is in process. Call information associated with the call is displayed, including a called number 705, the name of the called party 710, i.e. Kristen Lane, lapsed time of the call 715, a selector for ending the call 720, an indicator 724 that the call is not free, and a marketing message 725. The marketing message is provided to the user with an incentive for the user to convince Kristen to switch to A-Mobile. If the user is successful in convincing Kristen to join the A-Mobile network, the user will receive a $20 credit on the next bill. The marketing message 725 is merely one example of information that may be provided from a carrier to a subscriber, and those skilled in the art recognize that this example is not meant to limit embodiments, but that other information may be provided.

Figure 8:
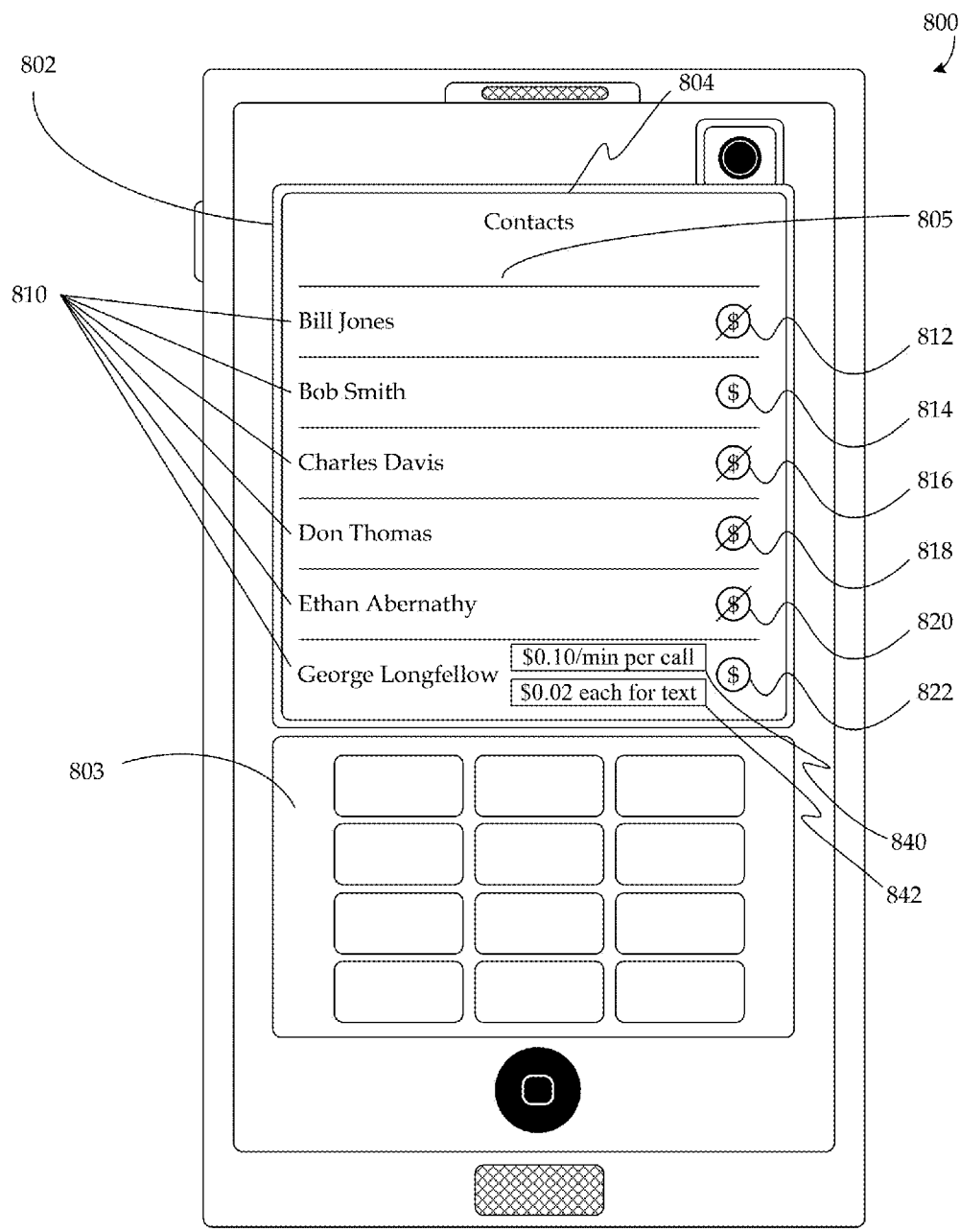
FIG. 8 is a view of contacts in a personal contact manager displayed on a communication device according to an embodiment.

FIG. 8 is a view of contacts in a personal contact manager device 800 displayed on a communication device according to an embodiment. In FIG. 8, the communication device includes a display 802 and a keypad 803. On the display 802, a personal contact manager 804 displays a contact list 805 including the names of contacts 810, i.e., Bill Jones, Bob Smith, Charles Davis, Don Thomas, Ethan Abernathy and George Longfellow. The contact list 805 is not meant to be limited to six entries, but is provided as an example. Those skilled in the art recognize that the contact list 805 may include many entries and further may be searched and/or scrolled to display other entries. In FIG. 8, calling plan information is integrated with contacts 810 in the personal contact manager 804 and the cost for initiating a call to each of the contacts 812-822 is presented with each contact in the personal contact manager. For example, the indicators associated with Bill Jones 812, Charles Davis 816, Don Thomas 818, and Ethan Abernathy 820 reflect that communication will not incur a charge. However, the indicators associated with Bob Smith 814 and George Longfellow 822 reflect that communication will incur a charge. Alternatively, an amount or amounts may be displayed, e.g., $0.10/min for calls 840 to George Longfellow and text charges of $0.02 each for text messages 842 sent to George Longfellow. Other indicators are possible without departing from the scope of the embodiments.

Figure 9:
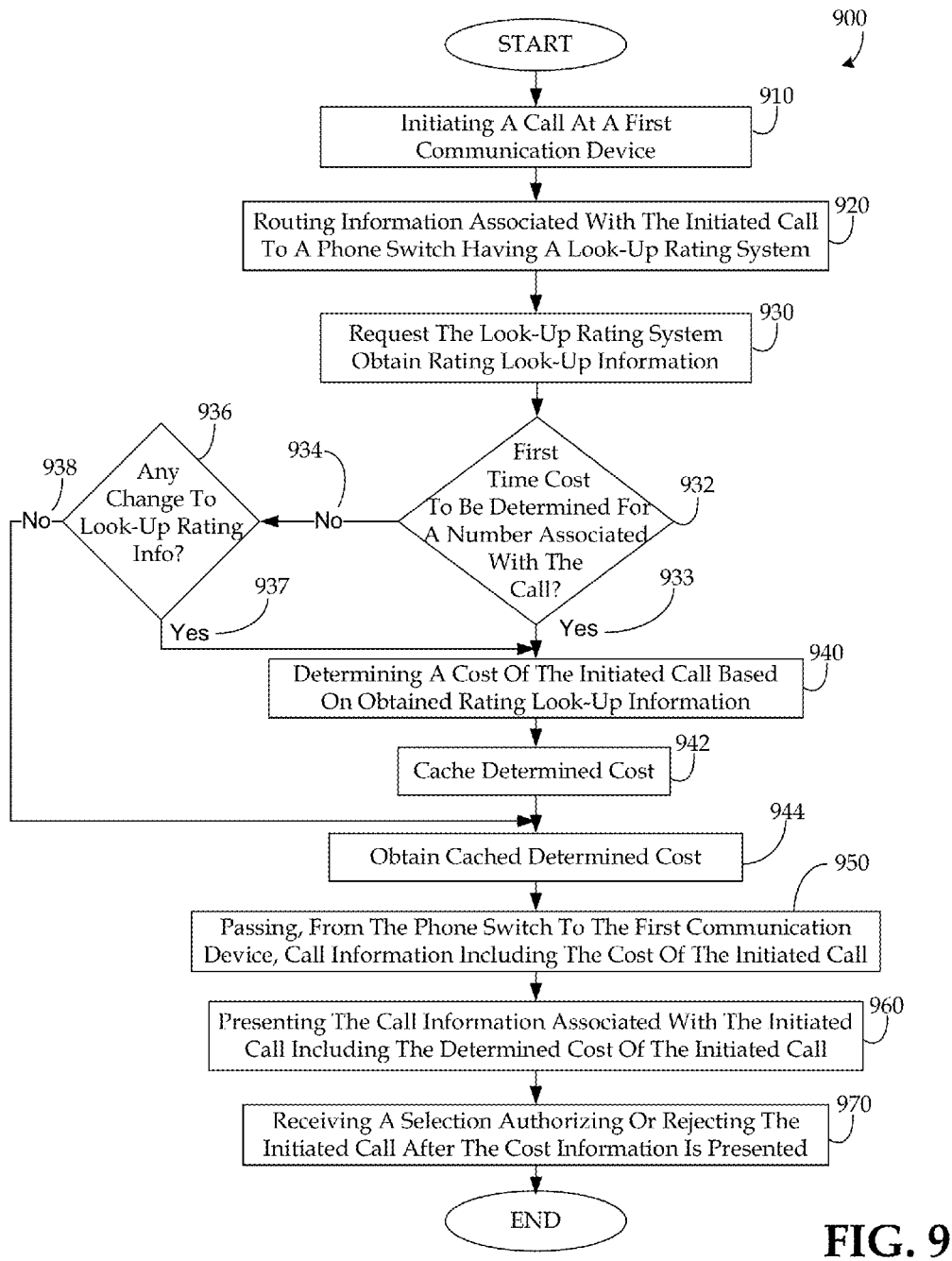
FIG. 9 is a flowchart of a method for providing call information feedback as determined by a carrier according to an embodiment.

FIG. 9 is a flowchart 900 of a method for providing call information feedback as determined by a carrier according to an embodiment. A call is initiated at a first communication device 910. The initiated call may include a state after a number has been entered, but not dialed, a call after the dialed numbers have been sent, but the connection has not been made, a call where the connection has been made, a incoming call, a text message prior to being sent, etc. Information associated with the initiated call is routed to a phone switch having a look-up rating system 920. The look-up rating system is requested to obtain look-up rating information 930. A determination is made whether this is the first time cost is to be determined for a number associated with the call 932. If yes 933, a cost of the initiated call is determined based on obtained look-up rating information 940 and the determined cost is cached 942.

If not 934, a determination is made whether there has been any change to the look-up rating information 936. If yes 937, the cost of the initiated call is still determined using the obtained look-up rating information 940. After the cost is determined, the cost is cached 942. If there has not been any change to the look-up rating information 938, the cost is not re-calculated and the determined cost is obtained from the cache 944.

In any event, after the determined cost has been obtained from cache 944, call information, including the cost of the initiated call, is passed from the phone switch to the first communication device 950. The call information associated with the initiated call including the determined cost of the initiated call is presented on a display for the user to analyze 960. A selection authorizing or rejecting the initiated call is sent after the cost information is presented 970.

Figure 10:
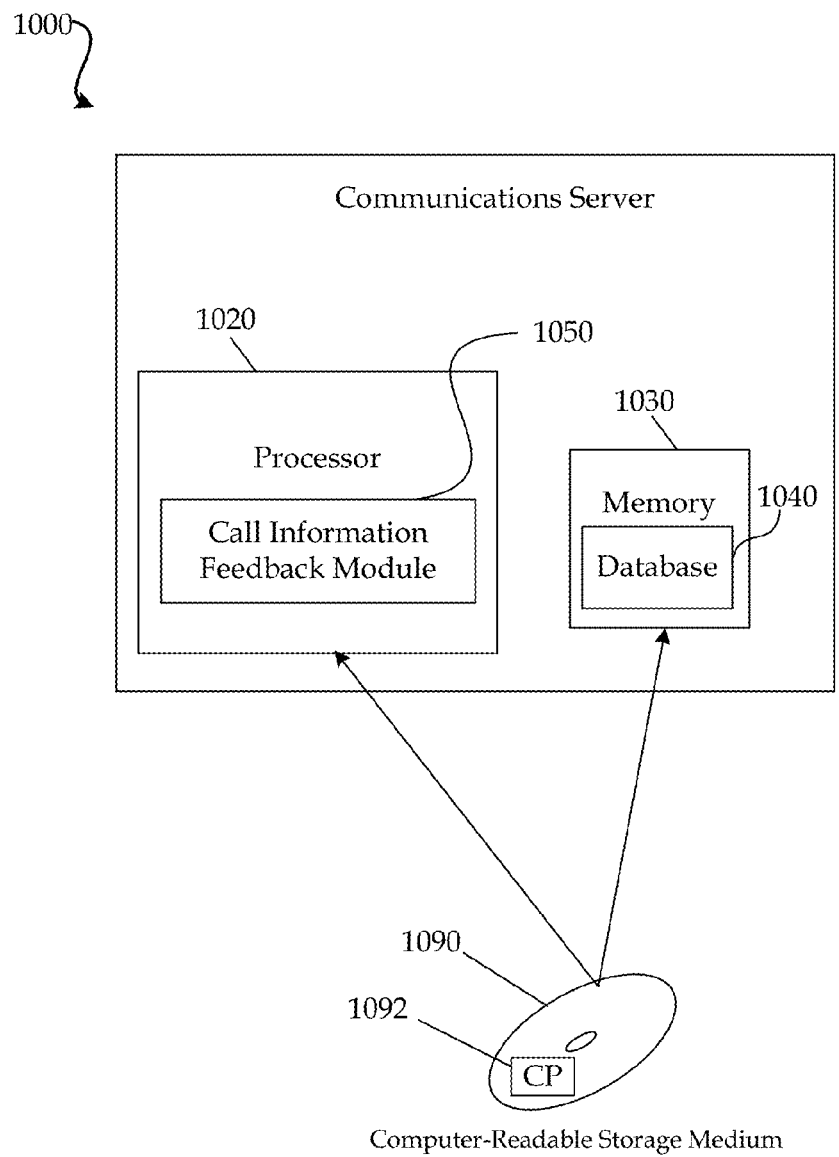
FIG. 10 illustrates a suitable computing environment for implementing a system as described above in FIGS. 1-9 according to an embodiment.

FIG. 10 illustrates a suitable computing environment 1000 for implementing a system as described above in FIGS. 1-9 according to an embodiment. In FIG. 10, a system for providing carrier network determination of customer feedback 1000 includes a processor 1020 and memory 1030. Embodiments may also be implemented in combination with other types of computer systems and program modules. Generally, program modules include routines, programs, components, data structures, and other types of structures that perform particular tasks or implement particular abstract data types. Moreover, those skilled in the art will appreciate that other computer system configurations may be implemented, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network.

Computer readable media 1090 includes computer storage media or other tangible media. Computer storage media 1090 includes volatile and nonvolatile, removable and non-removable media implemented in any method or technology for storage of information 1092, such as computer readable instructions, data structures, program modules or other data. Embodiments implemented on computer-readable media 1090 may refer to a mass storage device, such as a hard disk or CD-ROM drive. However, those skilled in the art will appreciate that tangible computer-readable media can be any available media that can be accessed or utilized by a processing device, e.g., server or communications network provider infrastructure.

By way of example, and not limitation, computer-readable media 1090 may include, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other tangible medium which can be used to store the desired information and which can be accessed by a processing device.

As mentioned briefly above, a number of program modules and data files may be stored and arranged for controlling the operation of processing devices. Thus, one or more processors 1020 may be configured to execute instructions that perform the operations of embodiments. Those skilled in the art will appreciate that various embodiments can be implemented (1) as a sequence of computer implemented acts or program modules running on a processing device and/or (2) as interconnected machine logic circuits or circuit modules within the processing devices. The implementation may be a matter of choice dependent, for example, on the performance choices. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of embodiments as recited within the claims set forth herein.

Memory 1030 thus may store the computer-executable instructions that, when executed by processor 1020, cause the call information feedback module 1050 to implement carrier network determination of customer feedback information as described above with reference to FIGS. 1-9. Database 1040 may store telephone numbers, contact information, rate plan associated with communication devices, etc. for providing call information feedback to customers.

Moreover, embodiments as illustrated in FIGS. 1-9 may be implemented using cloud computing, grid computing, and other distributed computing configurations. Embodiments as illustrated in FIGS. 1-9 may be integrated onto a single integrated circuit. Such a device may include one or more processing units, graphics units, communications units, system virtualization units and various application functionality all of which are integrated onto the chip substrate as a single integrated circuit. Still further, embodiments as illustrated in FIGS. 1-9 may be implemented using a framework for running applications on large clusters, where an application is divided into many small fragments of processes, which may be executed on any node in a distributed file system.

The foregoing description of the exemplary embodiment of the invention has been presented for the purposes of illustration and description. It is not intended to be exhaustive or to limit the embodiment to the precise form disclosed. Many modifications and variations are possible in light of the above teaching. It is intended that the scope of the embodiments be limited not with this detailed description, but rather by the claims appended hereto.

What is claimed is:

1. A method for providing real-time feedback of call information, comprising:
   receiving an indication to initiate a call at a first communication device;
   determining whether a cost of the call previously was calculated and cached;
   if the cost of the call previously was not calculated and cached, determining, by the first communication device, the cost of the call based on look-up rating information and caching the cost of the call;
   if the cost of the call previously was calculated and cached, determining, by the first communication device, whether the look-up rating information has changed since the cost previously was calculated and cached, and, if so, updating the cost of the call based on the look-up rating information and caching the cost of the call; and
   presenting call information and the cost of the call at the first communication device.

2. The method of claim 1, further comprising receiving a call handling selection from the first communication device for authorizing or rejecting the call after the cost and the associated call information are presented at the first communication device.

3. The method of claim 1, wherein the receiving the indication to initiate the call at the first communication device further comprises initiating the call at a device selected from the group consisting of: a smart phone, a mobile phone, a tablet computer, a desktop computer, a laptop computer, a gaming device, and a media access device.

4. The method of claim 1, wherein the receiving the indication to initiate the call at the first communication device further comprises initiating the call when a number is dialed using the first communication device, when a connection is made using the first communication device or when an incoming call is received at the first communication device.

5. The method of claim 1, wherein the receiving the indication to initiate the call at the first communication device further comprises initiating the call using VoIP, a cellular network, a landline or a broadband network.

6. The method of claim 1, wherein the determining, by the first communication device, the cost of the call based on look-up rating information and caching the cost of the call further comprises determining the cost using information associated with carriers involved with the initiated call, information associated with the service plan associated with the first communication device and parameters associated with the service plan subscribed to by the first communication device.

7. The method of claim 6, wherein the determining, by the first communication device, the cost of the call based on look-up rating information and caching the cost of the call further comprises determining the cost using the type of network associated with the first communication device and with a second device involved in the call and determining an amount of minutes associated with the service plan subscribed to by the first communication device remaining available for servicing the initiated call.

8. The method of claim 1, wherein presenting call information and the cost of the call at the first communication device at a time selected from a group consisting of: after a connection for the initiated call has been made, after a call number has been entered for the initiated call and before the connection for the initiated call has been made, before an incoming call to the first communication device is answered and after the incoming call to the first communication device is answered.

9. The method of claim 1 wherein the presenting the cost and the associated call information at the first communication device further comprises presenting the cost for initiating the call to each of the contacts with each contact in the personal contact manager.

10. The method of claim 1, further comprising:
    determining that a called party associated with the initiated call is a customer of a service provider different form a service provider of the calling party; and
    upon determination that a called party associated with the initiated call is the customer of the service provider different form the service provider of the calling party, presenting a marketing message to switch to the service provider.

11. A computer-readable storage device including executable instructions which, when executed by a processor, provides real-time feedback of call information, by:
    receiving an indication to initiate a call at a first communication device;
    determining whether a cost of the call previously was calculated and cached;
    if the cost of the call previously was not calculated and cached, determining, by the first communication device, the cost of the call based on look-up rating information and caching the cost of the call;
    if the cost of the call previously was calculated and cached, determining, by the first communication device, whether the look-up rating information has changed since the cost previously was calculated and cached, and, if so, updating the cost of the call based on the look-up rating information and caching the cost of the call; and presenting call information and the cost of the call at the first communication device.

12. The computer-readable storage device of claim 11, further comprising receiving a call handling selection from the first communication device for authorizing or rejecting the call after the cost and the associated call information are presented at the first communication device.

13. The computer-readable storage device of claim 11, wherein the receiving the indication to initiate the call at the first communication device further comprises initiating the call when a number is dialed using the first communication device, when a connection is made using the first communication device or when an incoming call is received at the first communication device.

14. The computer-readable storage device of claim 11, wherein the determining, by the first communication device, the cost of the call based on look-up rating information and caching the cost of the call further comprises determining the cost using information associated with carriers involved with the initiated call, information associated with the service plan associated with the first communication device and parameters associated with the service plan subscribed to by the first communication device.

15. The computer-readable storage device of claim 11, wherein presenting call information and the cost of the call at the first communication device at a time selected from a group consisting of: after a connection for the initiated call has been made, after a call number has been entered for the initiated call and before the connection for the initiated call has been made, before an incoming call to the first communication device is answered and after the incoming call to the first communication device is answered.

16. The computer-readable storage device of claim 11, wherein the presenting the cost and the associated call information at the first communication device further comprises presenting the cost for initiating the call to each of the contacts with each contact in the personal contact manager.

17. A communication device configured for receiving real-time feedback of call information, comprising:
memory for storing data;
a processor, coupled to the memory, for providing communication operation functions; and
a display, operative coupled to the processor, the display provided for presenting information to a user for enabling execution of the communication operation functions;
wherein the processor is operative to:
receive an indication to initiate a call at a first communication device;
determine whether a cost of the call previously was calculated and cached;
if the cost of the call previously was not calculated and cached, determine, by the first communication device, the cost of the call based on look-up rating information and caching the cost of the call;
if the cost of the call previously was calculated and cached, determine, by the first communication device, whether the look-up rating information has changed since the cost previously was calculated and cached, and, if so, updating the cost of the call based on the look-up rating information and caching the cost of the call; and
present call information and the cost of the call at the first communication device.

18. The communication device of claim 17, further comprising receiving a call handling selection from the first communication device for authorizing or rejecting the call after the cost and the associated call information are presented at the first communication device.

19. The communication device of claim 17, wherein the receiving the indication to initiate the call at the first communication device further comprises initiating the call when a number is dialed using the first communication device, when a connection is made using the first communication device or when an incoming call is received at the first communication device.

20. The communication device of claim 17, wherein the presenting the cost and the associated call information at the first communication device further comprises presenting the cost for initiating the call to each of the contacts with each contact in the personal contact manager.

* * * * *